United States Patent
Bai et al.

(10) Patent No.: US 11,665,558 B2
(45) Date of Patent: May 30, 2023

(54) BEAM FAILURE RECOVERY REQUEST MULTIPLEXING FOR SECONDARY CELLS

(71) Applicant: QUALCOMM Incorporated, San Diego, CA (US)

(72) Inventors: Tianyang Bai, Somerville, NJ (US); Yan Zhou, San Diego, CA (US); Jung Ho Ryu, Fort Lee, NJ (US); Tao Luo, San Diego, CA (US); Kiran Venugopal, Raritan, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/948,242

(22) Filed: Sep. 9, 2020

(65) Prior Publication Data

US 2021/0092619 A1 Mar. 25, 2021

Related U.S. Application Data

(60) Provisional application No. 62/902,730, filed on Sep. 19, 2019.

(51) Int. Cl.
*H04W 72/04* (2023.01)
*H04W 24/04* (2009.01)

(52) U.S. Cl.
CPC ....... *H04W 24/04* (2013.01); *H04W 72/0413* (2013.01)

(58) Field of Classification Search
CPC .............................. H04B 7/088; H04B 7/0695
See application file for complete search history.

(56) References Cited

U.S. PATENT DOCUMENTS

| 11,283,674 | B2* | 3/2022 | Cirik | ................... H04L 41/0668 |
| 2021/0029724 | A1* | 1/2021 | Tsai | ................... H04W 72/1242 |
| 2021/0058999 | A1* | 2/2021 | Chen | ................... H04W 24/04 |
| 2021/0083751 | A1* | 3/2021 | Chen | ................... H04W 72/0413 |

(Continued)

OTHER PUBLICATIONS

Apple Inc: "Feature Lead Summary #2 on L1-SINR and SCell BFR", 3GPP Draft, 3GPP TSG RAN WG1 #98, R1-1909743 Feature Lead Summary #2 on L1-SINR and SCell BFR R5, 3rd Generation Partnership Project (3GPP), Mobile Competence Centre; 650, Route Des Lucioles; F-06921 Sophia-Antipolis Cede, vol. RAN WG1, No. Prague, Czech Republic; Aug. 26, 2019-Aug. 30, 2019, Sep. 3, 2019 (Sep. 3, 2019), XP051766336, 25 Pages, Retrieved from the Internet: URL: http://www.3gpp.org/ftp/tsg_ran/WG1_RL1/TSGR1_98/Docs/R1-1909743.zip, [retrieved on Sep. 3, 2019], p. 17.

(Continued)

*Primary Examiner* — Bo Hui A Zhu
(74) *Attorney, Agent, or Firm* — Harrity & Harrity, LLP

(57) ABSTRACT

Various aspects of the present disclosure generally relate to wireless communication. In some aspects, a user equipment (UE) may detect a collision between a beam failure recovery request (BFRQ) transmission to trigger a beam failure recovery for a secondary cell and another uplink transmission on an uplink channel; and transmit, on the uplink channel, at least one of the BFRQ transmission or the other uplink transmission based at least in part on multiplexing rule. Numerous other aspects are provided.

28 Claims, 6 Drawing Sheets

(56) References Cited

U.S. PATENT DOCUMENTS

2022/0052748 A1* 2/2022 Yang ................ H04W 74/0841

OTHER PUBLICATIONS

Catt: "Consideration on Multi-Beam Enhancements", 3GPP Draft; 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages. Retrieved from the Internet: URL: http://www.3gpp.org/ftp/tsg_ran/WG1_RL1/TSGR1_98/Docs/R1-1908603.zip [retrieved on Aug. 17, 2019], chapter 3; pp. 3,4, p. 2, paragraph section 2.1—p. 3, paragraph section 2.2.
International Search Report and Written Opinion—PCT/US2020/070524—ISA/EPO—Nov. 18, 2020.
Lenovo, et al., "Discussion of Multi-Beam Operation", 3GPP Draft; 3GPP TSG RAN WG1 Meeting #97, R1-1908721_MULTI_BEAM_FINAL, 3rd Generation Partnership Project (3GPP), Mobi Le Competence Centre, 650, Route Des Lucioles, F-06921 Sophia-Antipolis Cedex, France, vol. RAN WG1, No. Reno, USA; May 13, 2019-May 17, 2019, Aug. 17, 2019 (Aug. 17, 2019), XP051765329, 9 Pages. Retrieved from the Internet: URL: http://www.3gpp.org/ftp/tsg_ran/WG1_RL1/TSGR1_98/Docs/R1-1908721.zip, [retrieved on Aug. 17, 2019], chapter 2.4; pp. 7,8.

* cited by examiner

BEAM FAILURE RECOVERY REQUEST MULTIPLEXING FOR SECONDARY CELLS

CROSS-REFERENCE TO RELATED APPLICATION

This Patent application claims priority to U.S. Provisional Patent Application No. 62/902,730, filed on Sep. 19, 2019, entitled "BEAM FAILURE RECOVER REQUEST MULTIPLEXING FOR SECONDARY CELLS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam failure recovery request multiplexing for secondary cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting a collision between a beam failure recovery request (BFRQ) transmission to trigger a beam failure recovery for a secondary cell and another uplink transmission on an uplink channel; and transmitting, on the uplink channel, at least one of the BFRQ transmission or the other uplink transmission based at least in part on multiplexing rule.

In some aspects, a UE for wireless communication may include memory and one or more processors operatively coupled to the memory. The memory and the one or more processors may be configured to detect a collision between a BFRQ transmission to trigger a beam failure recovery for a secondary cell and another uplink transmission on an uplink channel; and transmit, on the uplink channel, at least one of the BFRQ transmission or the other uplink transmission based at least in part on multiplexing rule.

In some aspects, a non-transitory computer-readable medium may store one or more instructions for wireless communication. The one or more instructions, when executed by one or more processors of a UE, may cause the one or more processors to detect a collision between a BFRQ transmission to trigger a beam failure recovery for a secondary cell and another uplink transmission on an uplink channel; and transmit, on the uplink channel, at least one of the BFRQ transmission or the other uplink transmission based at least in part on multiplexing rule.

In some aspects, an apparatus for wireless communication may include means for detecting a collision between a BFRQ transmission to trigger a beam failure recovery for a secondary cell and another uplink transmission on an uplink channel; and means for transmitting, on the uplink channel, at least one of the BFRQ transmission or the other uplink transmission based at least in part on multiplexing rule.

Aspects generally include a method, apparatus, system, computer program product, non-transitory computer-readable medium, user equipment, base station, wireless communication device, and/or processing system as substantially described herein with reference to and as illustrated by the accompanying drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
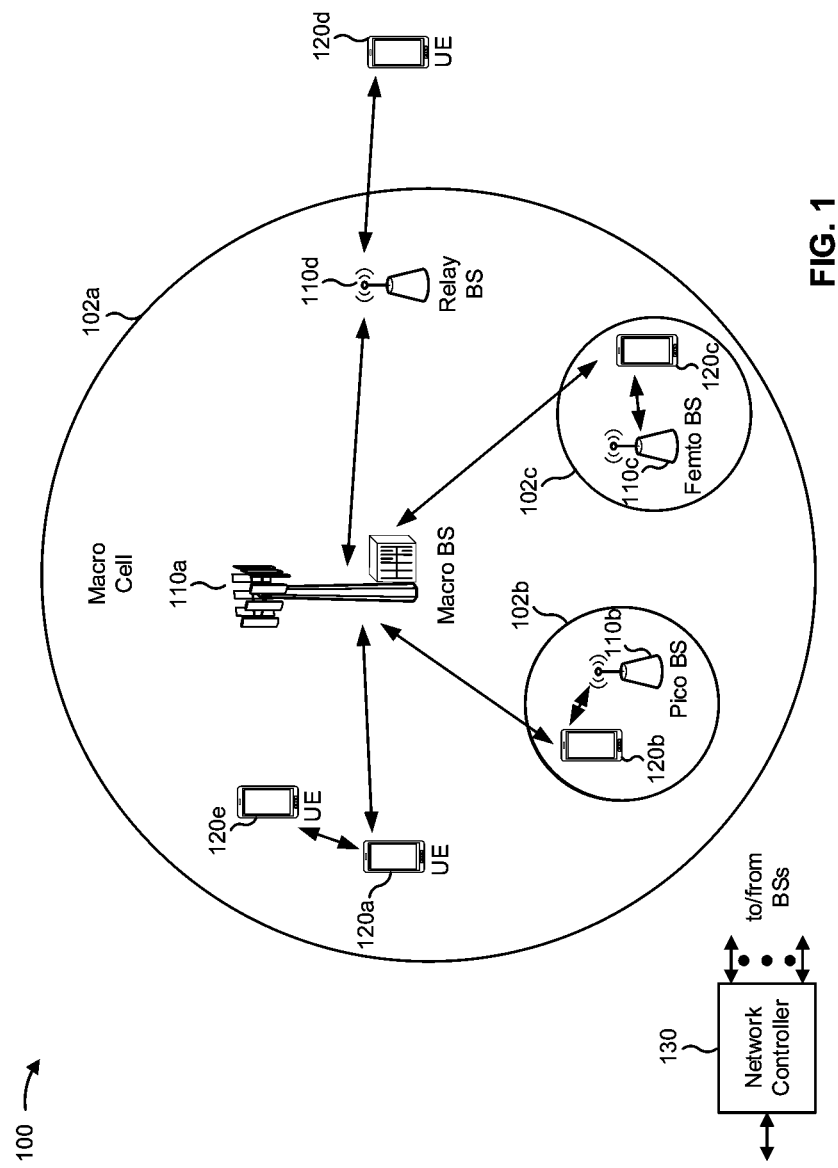
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
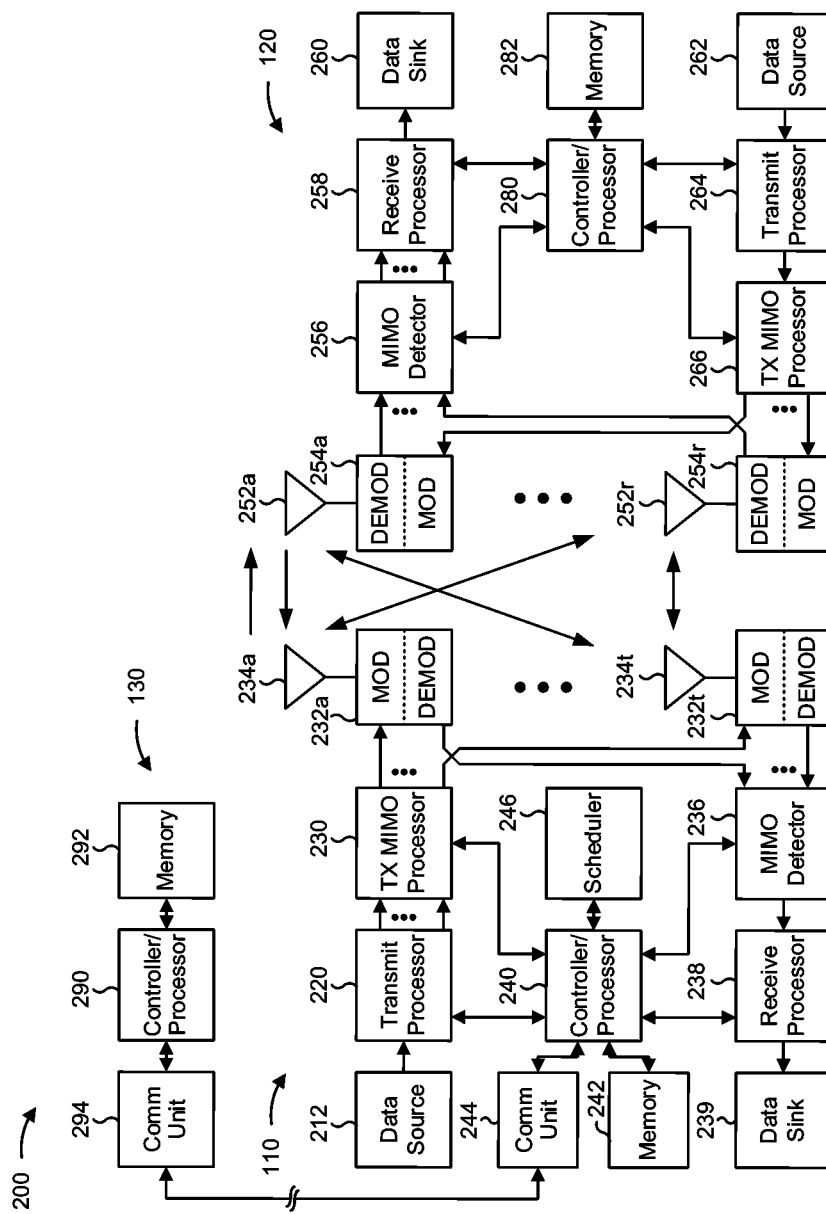
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam failure recovery request (BFRQ) multiplexing for secondary cells, as described in more detail elsewhere herein. For example, controller/processor 240 of base station 110, controller/processor 280 of UE 120, and/or any other component(s) of FIG. 2 may perform or direct operations of, for example, process 600 of FIG. 6 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6 and/or other processes as described herein. A scheduler 246 may schedule UEs for data transmission on the downlink and/or uplink.

In some aspects, UE 120 may include means for detecting a collision between a BFRQ transmission to trigger a beam failure recovery for a secondary cell and another uplink transmission on an uplink channel, means for transmitting, on the uplink channel, at least one of the BFRQ transmission or the other uplink transmission based at least in part on multiplexing rule, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
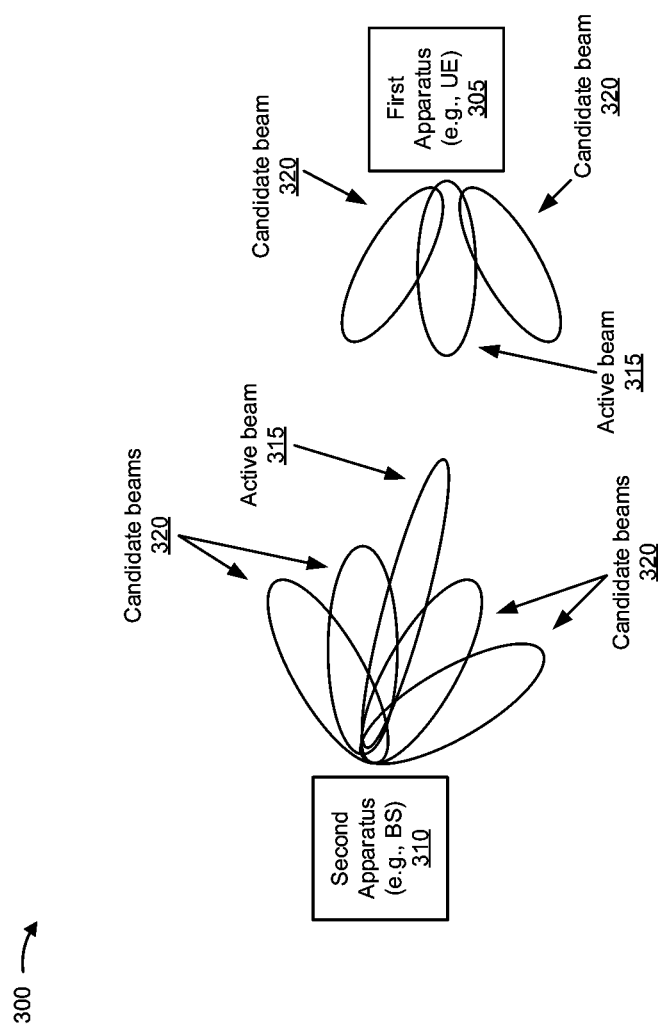
FIG. 3 is a diagram illustrating an example of wireless communication via one or more beams, in accordance with various aspects of the present disclosure.

FIG. 3 is a diagram illustrating an example 300 of wireless communication via one or more beams, in accordance with certain aspects of the present disclosure.

As shown in FIG. 3, a first apparatus 305 (e.g., shown as a UE, such as UE 120, in example 300) may communicate with a second apparatus 310 (e.g., shown as a BS, such as BS 110, in example 300) using one or more active beams 315. In some aspects, the first apparatus 305 and the second apparatus 310 may also be capable of communicating via one or more candidate beams 320. In some aspects, an active beam 315 may be selected from a set of candidate beams 320 by comparing beam parameters (e.g., RSRP, RSRQ, RSSI, and/or the like) of the set of candidate beams 320. For example, an active beam 315 may be the beam that has the best beam parameters among all beams in the set of candidate beams 320. In some aspects, the beams may operate in a millimeter wave radio frequency band.

In some aspects, if the active beam 315 experiences a failure, the first apparatus 305 may perform a beam failure recovery procedure. For example, upon detecting the failure of the active beam 315, the first apparatus 305 may attempt to communicate with the second apparatus 310 by transmitting a BFRQ transmission via one or more candidate beams 320.

The first apparatus 305 may detect the failure based at least in part on monitoring one or more beam failure detection reference signals. For example, when first apparatus 305 determines that a measured RSRP of a beam failure detection reference signal satisfies a threshold, first apparatus 305 may determine that a beam failure has occurred.

As indicated above, FIG. 3 is provided as an example. Other examples may differ from what is described with regard to FIG. 3.

Figure 4:
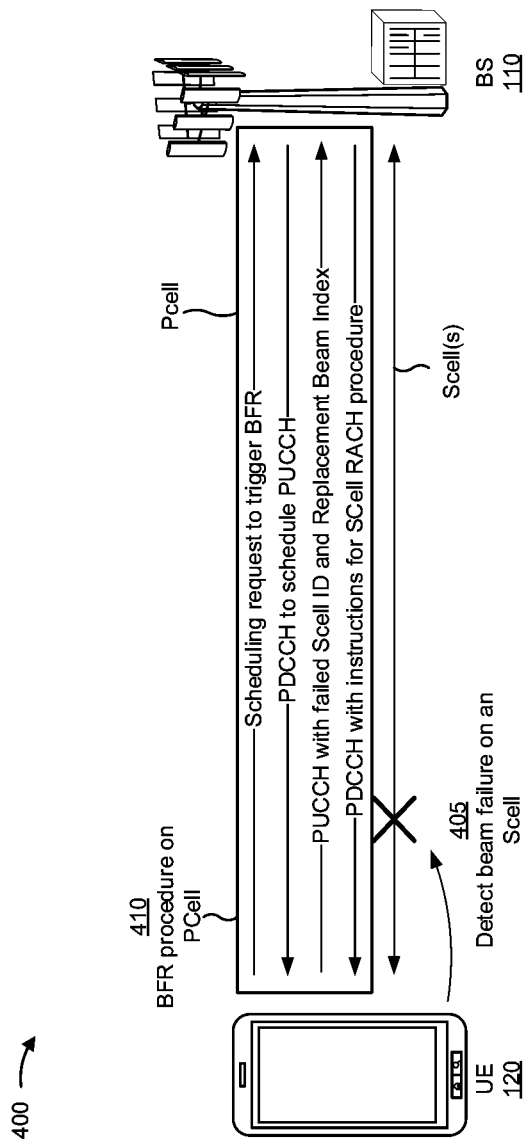
FIG. 4 is a diagram illustrating an example of a beam failure recovery procedure, in accordance with various aspects of the present disclosure.

FIG. 4 is a diagram illustrating an example 400 of a beam failure recovery procedure, in accordance with certain aspects of the present disclosure.

As shown in FIG. 4, a BS 110 and a UE 120 may communicate with one another using carrier aggregation. Using carrier aggregation, BS 110 and UE 120 may communicate with one another using a primary cell (PCell) and one or more secondary cells (SCells). In example 400, the secondary cells are DL-only secondary cells, meaning that the secondary cells are configured for only downlink communications, and are not configured for uplink communications. However, in some aspects, secondary cells may be configured for DL and UL operation, UL-only operation, DL-only operation, a combination thereof, and/or the like.

As shown by reference number 405, UE 120 may detect beam failure on a DL-only secondary cell. For example, UE 120 may detect the beam failure by monitoring for a beam failure detection reference signal on the DL-only secondary cell. As shown by reference number 410, UE 120 and BS 110 may perform a beam failure recovery (BFR) procedure, which may also be termed a link recovery procedure, using the primary cell. For example, the UE 120 may transmit a BFRQ scheduling request (SR) (BFRQ-SR) on the primary cell via a physical uplink control channel (PUCCH). The scheduling request may trigger beam failure recovery (BFR). Based at least in part on receiving the scheduling request, BS 110 may transmit, on the primary cell, a physical downlink shared channel (PDCCH) communication that schedules a PUCCH communication for BFR.

The UE 120 may receive the PDCCH communication, and may transmit the scheduled PUCCH communication on the primary cell. The PUCCH communication may identify the secondary cell that experienced the beam failure and/or may indicate a candidate beam index for a candidate beam to replace the failed beam. For example, the PUCCH communication may include a medium access control (MAC) control element (CE) (MAC-CE) (which may be termed a BFRQ MAC-CE) that identifies the failed secondary cell and the replacement beam. Based at least in part on receiving the PUCCH communication, the base station 110 may transmit, on the primary cell, a PDCCH communication that instructs the UE 120 regarding the BFR procedure. For example, the PDCCH communication may instruct the UE 120 to perform a random access procedure for the secondary cell on one or more candidate beams. The UE 120 may perform BFR according to the PDCCH communication to obtain a new beam for communications on the secondary cell.

As indicated above, FIG. 4 is provided as an example. Other examples may differ from what is described with regard to FIG. 4.

As described above, a UE may detect a beam failure of a beam and may transmit one or more BFRQ transmissions, which may also be termed link recovery request (LRR) transmissions, to perform a beam failure recovery procedure (a link recovery procedure). For example, the UE may transmit a BFRQ-SR via a primary cell to initiate the beam failure recovery procedure and may subsequently transmit a BFRQ MAC-CE via the primary cell to enable completion of the beam failure recovery procedure. In this case, the UE uses dedicated resources on the primary cell to transmit the one or more BFRQ transmissions.

However, when a secondary cell provides uplink resources for UE transmissions, the UE may not need to wait for dedicated resources on the primary cell to transmit the BFRQ transmission. For example, the UE may identify an uplink resource on the secondary cell and may use the uplink resource on the secondary cell to transmit a BFRQ transmission. In this way, the UE may reduce a delay associated with waiting for dedicated resources on the primary cell. However, another uplink transmission may be scheduled on the secondary cell for the same uplink resource that the UE identifies for transmitting the BFRQ transmission. For example, the UE may be scheduled to transmit an uplink control information (UCI) transmission, an uplink data transmission, and/or the like at a particular time resource that the UE identifies for transmitting the BFRQ transmission. This may result in a collision between the BFRQ transmission and the other uplink transmission, which may result in the other uplink communication being inadvertently dropped.

Some aspects described herein enable selective multiplexing of a BFRQ transmission with another uplink transmission on an uplink channel of a secondary cell. For example, a UE may detect a collision between the BFRQ transmission and the other uplink transmission and may selectively multiplex the BFRQ transmission onto the uplink channel based at least in part on a multiplexing rule. In this case, the UE may transmit at least one of the uplink transmission or the BFRQ transmission on the uplink channel based at least in part on the multiplexing rule. In this way, the UE enables BFRQ transmission on a secondary cell without resulting in inadvertent dropping of other uplink communications.

Figure 5:
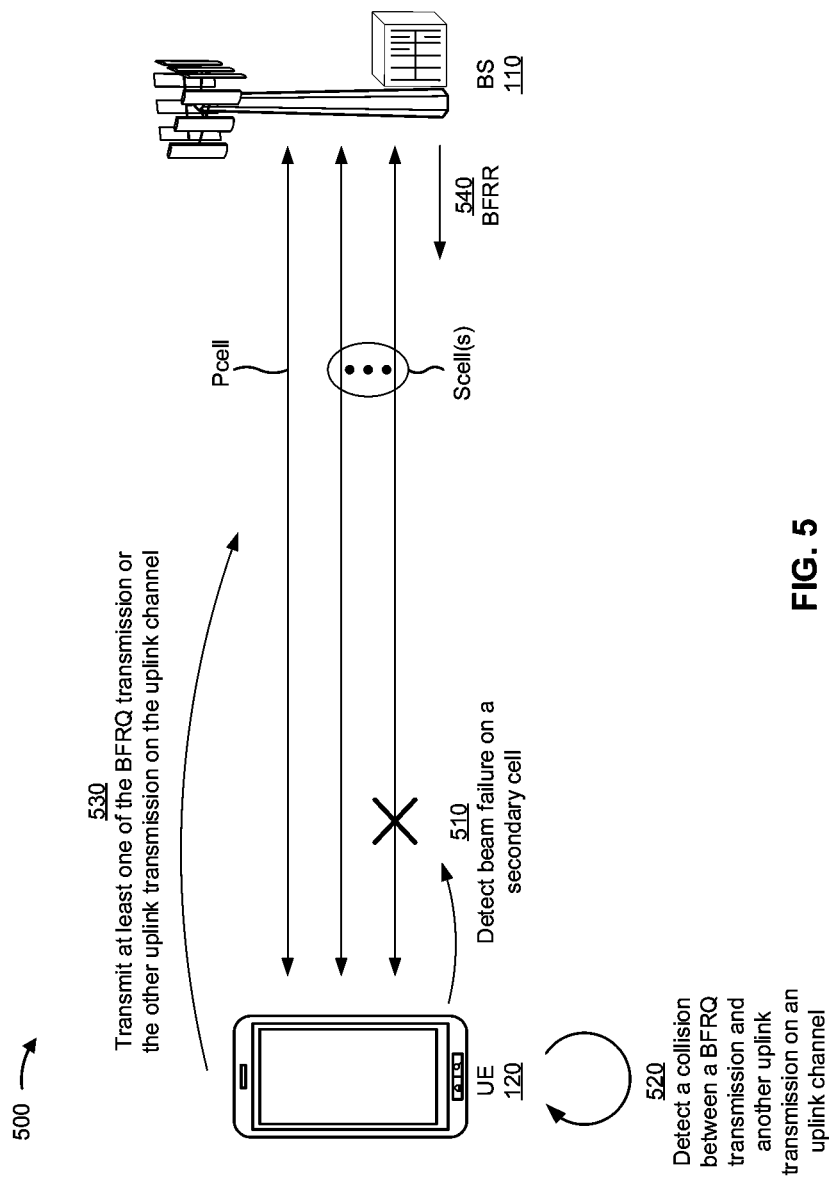
FIG. 5 is a diagram illustrating an example of beam failure recovery request multiplexing for secondary cells, in accordance with various aspects of the present disclosure.

FIG. 5 is a diagram illustrating an example 500 of BFRQ multiplexing for secondary cells, in accordance with various aspects of the present disclosure. As shown in FIG. 5, example 500 includes a BS 110 and a UE 120.

As shown in FIG. 5, and by reference number 510, UE 120 may detect a beam failure on a secondary cell. For example, UE 120 may determine that a measurement of a beam failure detection reference signal satisfies a measurement threshold, as described above. In some aspects, UE 120 may determine to initiate a beam failure recovery procedure. For example, UE 120 may determine to transmit a BFRQ-SR to initiate the beam failure recovery procedure.

As shown in FIG. 5, and by reference number 520, UE 120 may detect a collision between a BFRQ transmission and another uplink transmission on an uplink channel. For example, UE 120 may determine that a resource, on the uplink channel, on which UE 120 may transmit the BFRQ transmission, is allocated for transmission of another uplink transmission. In some aspects, UE 120 may detect a collision for a particular type of BFRQ transmission. For example, UE 120 may detect a collision for a transmission of a BFRQ-SR, a subsequent BFRQ MAC-CE, and/or the like. Similarly, UE 120 may detect a collision with a particular type of uplink transmission. For example, UE 120 may detect a collision with an uplink control information (UCI) on a PUCCH type of uplink channel, an uplink data transmission on a physical uplink shared channel (PUSCH) type of uplink channel, and/or the like.

In some aspects, UE 120 may evaluate a multiplexing rule to determine whether to multiplex the BFRQ transmission onto the uplink channel. For example, UE 120 may determine to multiplex the BFRQ transmission onto a particular type of channel that corresponds to a particular type of the BFRQ transmission. In this case, UE 120 may determine to multiplex a BFRQ-SR onto a PUCCH, a BFRQ MAC-CE with uplink data onto a PUSCH that is to convey an uplink data transmission, and/or the like. Further to this example, when the PUCCH includes hybrid automatic repeat request (HARQ) acknowledgement (ACK) information bits associated with a PUCCH format 2, format 3, or format 4, UE 120 may multiplex the BFRQ transmission onto the uplink channel.

In some aspects, UE 120 may determine to multiplex the BFRQ transmission onto an uplink channel based at least in part on identifying a match between a type of the BFRQ transmission and a type of the other uplink transmission. For example, UE 120 may determine that the BFRQ transmission is a BFRQ-SR and a UCI transmission is another SR transmission. In this case, UE 120 may determine to multiplex the BFRQ-SR and the other SR. Additionally, or alternatively, UE 120 may determine priorities of the other uplink transmission (e.g., based at least in part on a type of the other uplink transmission) and the BFRQ transmission and may determine whether to multiplex the BFRQ transmission based at least in part on the priority. For example, UE 120 may determine to multiplex the BFRQ transmission with the other transmission when the BFRQ transmission is associated with a higher priority than the other transmission. In this case, UE 120 may determine a priority of the BFRQ transmission based at least in part on a type of the BFRQ transmission. For example, UE 120 may determine a first priority for a BFRQ-SR and a second, different priority for a BFRQ MAC-CE.

In some aspects, UE 120 may determine whether to multiplex the BFRQ transmission based at least in part on a characteristic of a first secondary cell on which a beam failure is detected and/or a second secondary cell on which the uplink channel is conveyed. For example, when the BFRQ transmission is for a beam failure recovery procedure for a first secondary cell with a relatively high priority and the second secondary cell on which the uplink channel is to be conveyed is associated with a relatively low priority, UE 120 may determine to multiplex the BFRQ transmission onto the uplink channel. Additionally, or alternatively, UE 120 may determine to multiplex the BFRQ transmission onto the uplink channel when the first secondary cell and the secondary cell are included in the same secondary cell group. Additionally, or alternatively, UE 120 may determine not to multiplex the BFRQ transmission onto the uplink channel when the BFRQ transmission is scheduled for subsequent transmission on a third secondary cell. In contrast, when the BFRQ transmission is scheduled for subsequent transmission on the second secondary cell, UE 120 may multiplex the BFRQ transmission onto the uplink channel (of the second secondary cell) to enable reduced transmission delay.

In some aspects, UE 120 may determine whether to multiplex the BFRQ transmission onto the uplink channel based at least in part on a channel characteristic of the secondary cell. For example, when UE 120 determines that a secondary cell is associated with less than a threshold channel quality (e.g., when UE 120 detects the beam failure for the secondary cell), UE 120 may determine not to multiplex the BFRQ onto an uplink channel of the secondary cell. Additionally, or alternatively, UE 120 may determine that the secondary cell is associated with greater than or equal to a threshold channel quality and may determine to multiplex the BFRQ onto an uplink channel of the secondary cell.

In some aspects, UE 120 may determine whether to multiplex the BFRQ transmission onto the uplink channel based at least in part on a beam mapping. For example, UE 120 may forgo multiplexing a BFRQ scheduling request onto an uplink channel when multiplexing the BFRQ-SR onto the uplink channel will result in a beam failure for a corresponding BFRQ MAC-CE. In some aspects, UE 120 may determine whether to multiplex the BFRQ transmission onto the uplink channel based at least in part on a timing criterion. For example, UE 120 may select a first available resource (e.g., of resources of a primary cell and/or one or more secondary cells) on which to multiplex the BFRQ transmission with another uplink transmission, thereby reducing a delay associated with transmitting the BFRQ transmission to BS 110.

As shown in FIG. 5, and by reference number 530, UE 120 may transmit at least one of the BFRQ transmission or the other uplink transmission on the uplink transmission channel. For example, based at least in part on determining to multiplex the BFRQ transmission onto the uplink channel, UE 120 may transmit both the BFRQ transmission and the other uplink transmission on the uplink channel. Additionally, or alternatively, UE 120 may transmit the BFRQ transmission on the uplink channel and drop the other uplink transmission. In contrast, based at least in part on determining not to multiplex the BFRQ transmission onto the uplink channel, UE 120 may transmit the other uplink transmission on the uplink channel and delay the BFRQ transmission until a dedicated resource (e.g., on a secondary cell, a primary cell, and/or the like). In this way, UE 120 may enable a beam failure recovery procedure on a secondary cell. For example, as shown by reference number 540, BS 110 may transmit a beam failure recovery response (BFRR) as a response to a BFRQ-SR, thereby initiating beam recovery, as described above.

As indicated above, FIG. 5 is provided as an example. Other examples may differ from what is described with respect to FIG. 5.

Figure 6:
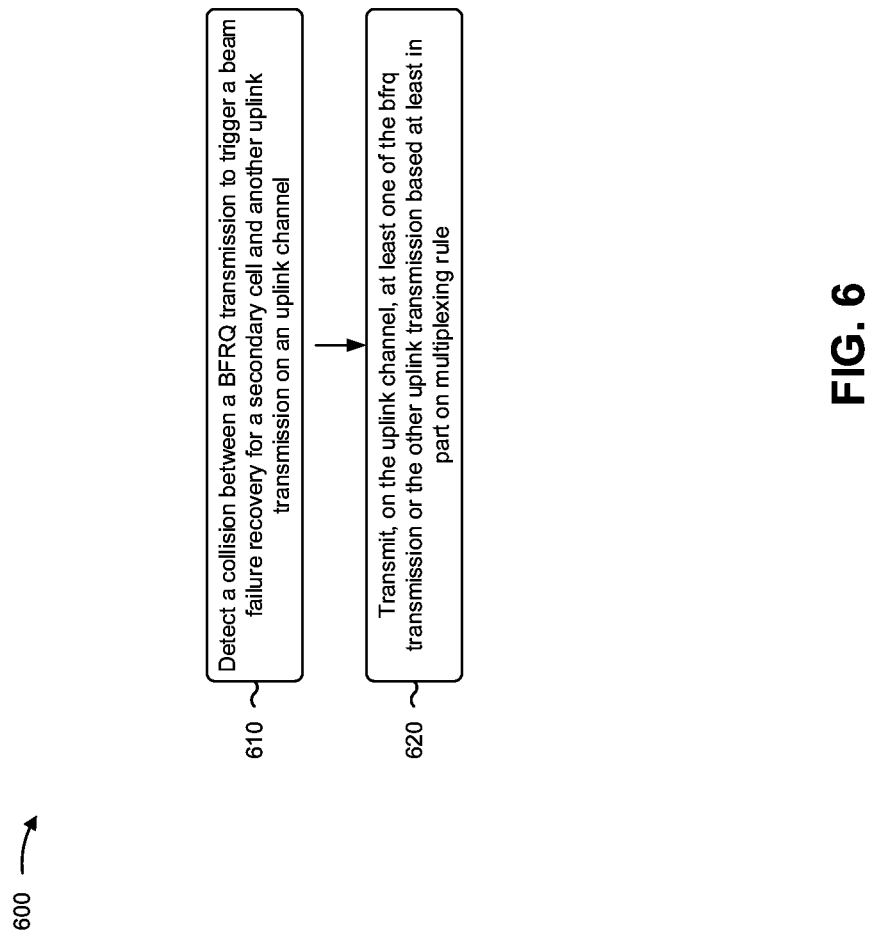
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., the first apparatus 305, UE 120, and/or the like) performs operations associated with beam failure recovery request multiplexing for secondary cells.

As shown in FIG. 6, in some aspects, process 600 may include detecting a collision between a beam failure recovery request (BFRQ) transmission to trigger a beam failure recovery for a secondary cell and another uplink transmission on an uplink channel (block 610). For example, the UE (e.g., using controller/processor 280, transmit processor 264, TX MIMO processor 266, MOD 254, antenna 252, and/or the like) may detect a collision between a beam failure recovery request (BFRQ) transmission to trigger a beam failure recovery for a secondary cell and another uplink transmission on an uplink channel, as described above.

As further shown in FIG. 6, in some aspects, process 600 may include transmitting, on the uplink channel, at least one of the BFRQ transmission or the other uplink transmission based at least in part on multiplexing rule (block 620). For example, the UE (e.g., using controller/processor 280, transmit processor 264, TX MIMO processor 266, MOD 254, antenna 252, and/or the like) may transmit, on the uplink channel, at least one of the BFRQ transmission or the other uplink transmission based at least in part on multiplexing rule, as described above.

Process 600 may include additional aspects, such as any single aspect or any combination of aspects described below and/or in connection with one or more other processes described elsewhere herein.

In a first aspect, the other uplink transmission is an uplink control information or uplink data transmission.

In a second aspect, alone or in combination with the first aspect, the uplink channel is a physical uplink control channel or a physical uplink shared channel.

In a third aspect, alone or in combination with one or more of the first and second aspects, the BFRQ transmission is a BFRQ scheduling request or a BFRQ media access control (MAC) control element (CE).

In a fourth aspect, alone or in combination with one or more of the first through third aspects, process 600 includes determining whether to multiplex the BFRQ transmission with the other uplink transmission based at least in part on at least one of a type of the other uplink transmission, a type of the BFRQ transmission, a delay criterion, a data priority criterion, a cell priority criterion, a characteristic of the secondary cell, or a characteristic of a secondary cell group is including the secondary cell.

In a fifth aspect, alone or in combination with one or more of the first through fourth aspects, process 600 includes determining whether to multiplex the BFRQ transmission with the other uplink transmission based at least in part on a characteristic of an uplink beam associated with the uplink channel.

In a sixth aspect, alone or in combination with one or more of the first through fifth aspects, the characteristic of the uplink beam is based at least in part on a channel measurement.

In a seventh aspect, alone or in combination with one or more of the first through sixth aspects, determining whether to multiplex the BFRQ transmission with the other uplink transmission includes determining to multiplex the BFRQ transmission with the other uplink transmission based at least in part on the channel measurement satisfying a channel measurement threshold.

In an eighth aspect, alone or in combination with one or more of the first through seventh aspects, process 600 includes determining whether to multiplex the BFRQ transmission with the other uplink transmission based at least in part on a mapping of a scheduling request to a scheduled beam or scheduled cell.

In a ninth aspect, alone or in combination with one or more of the first through eighth aspects, determining whether to multiplex the BFRQ transmission with the other uplink transmission includes determining not to multiplex the BFRQ transmission with the other uplink transmission based at least in part on the mapping being to a failed beam.

In a tenth aspect, alone or in combination with one or more of the first through ninth aspects, process 600 includes determining whether to multiplex the BFRQ transmission with the other uplink transmission based at least in part on a timing of the uplink channel relative to one or more other available resources.

In an eleventh aspect, alone or in combination with one or more of the first through tenth aspects, determining whether to multiplex the BFRQ transmission with the other uplink transmission includes determining to multiplex the BFRQ transmission with the other uplink transmission based at least in part on the other uplink transmission being associated with an earliest available resource.

In an eleventh aspect, alone or in combination with one or more of the first through tenth aspects, process 600 includes determining whether to multiplex the BFRQ transmission with the other uplink transmission based at least in part on a type of uplink control information (UCI) with which the BFRQ is to be multiplexed.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   detecting a collision between a beam failure recovery request (BFRQ) transmission to trigger a beam failure recovery for a secondary cell and another uplink transmission on an uplink channel of another secondary cell of a secondary cell group including the secondary cell;
   determining whether to multiplex the BFRQ transmission with the other uplink transmission based at least in part on a characteristic of an uplink beam associated with the uplink channel; and
   transmitting, on the uplink channel, at least one of the BFRQ transmission or the other uplink transmission based at least in part on a multiplexing rule.

2. The method of claim 1, wherein the other uplink transmission is an uplink control information or uplink data transmission.

3. The method of claim 1, wherein the uplink channel is a physical uplink control channel or a physical uplink shared channel.

4. The method of claim 1, wherein the BFRQ transmission is a BFRQ scheduling request or a BFRQ media access control (MAC) control element (CE).

5. The method of claim 1, further comprising:
   determining whether to multiplex the BFRQ transmission with the other uplink transmission based at least in part on a type of uplink control information (UCI) with which the BFRQ is to be multiplexed.

6. The method of claim 1, further comprising:
   determining whether to multiplex the BFRQ transmission with the other uplink transmission based at least in part on at least one of:
   a type of the other uplink transmission,
   a type of the BFRQ transmission,
   a delay criterion,
   a data priority criterion,
   a cell priority criterion,
   a characteristic of the secondary cell, or
   a characteristic of the secondary cell group including the secondary cell.

7. The method of claim 1, wherein the characteristic of the uplink beam is based at least in part on a channel measurement.

8. The method of claim 7, wherein determining whether to multiplex the BFRQ transmission with the other uplink transmission comprises:
   determining to multiplex the BFRQ transmission with the other uplink transmission based at least in part on the channel measurement satisfying a channel measurement threshold.

9. The method of claim 1, further comprising:
determining whether to multiplex the BFRQ transmission with the other uplink transmission based at least in part on a mapping of a scheduling request to a scheduled beam or scheduled cell.

10. The method of claim 9, wherein determining whether to multiplex the BFRQ transmission with the other uplink transmission comprises:
determining not to multiplex the BFRQ transmission with the other uplink transmission based at least in part on the mapping being to a failed beam.

11. The method of claim 1, further comprising:
determining whether to multiplex the BFRQ transmission with the other uplink transmission based at least in part on a timing of the uplink channel relative to one or more other available resources.

12. The method of claim 11, wherein determining whether to multiplex the BFRQ transmission with the other uplink transmission comprises:
determining to multiplex the BFRQ transmission with the other uplink transmission based at least in part on the other uplink transmission being associated with an earliest available resource.

13. A user equipment (UE) for wireless communication, comprising:
a memory; and
one or more processors coupled to the memory and configured to:
detect a collision between a beam failure recovery request (BFRQ) transmission to trigger a beam failure recovery for a secondary cell and another uplink transmission on an uplink channel of another secondary cell of a secondary cell group including the secondary cell;
determine whether to multiplex the BFRQ transmission with the other uplink transmission based at least in part on a characteristic of an uplink beam associated with the uplink channel; and
transmit, on the uplink channel, at least one of the BFRQ transmission or the other uplink transmission based at least in part on a multiplexing rule.

14. The UE of claim 13, wherein the other uplink transmission is an uplink control information or uplink data transmission.

15. The UE of claim 13, wherein the uplink channel is a physical uplink control channel or a physical uplink shared channel.

16. The UE of claim 13, wherein the BFRQ transmission is a BFRQ scheduling request or a BFRQ media access control (MAC) control element (CE).

17. The UE of claim 13, wherein the one or more processors are further configured to:
determine whether to multiplex the BFRQ transmission with the other uplink transmission based at least in part on a type of uplink control information (UCI) with which the BFRQ is to be multiplexed.

18. The UE of claim 13, wherein the one or more processors are further configured to:
determine whether to multiplex the BFRQ transmission with the other uplink transmission based at least in part on at least one of:
a type of the other uplink transmission,
a type of the BFRQ transmission,
a delay criterion,
a data priority criterion,
a cell priority criterion,
a characteristic of the secondary cell, or
a characteristic of the secondary cell group including the secondary cell.

19. The UE of claim 13, wherein the characteristic of the uplink beam is based at least in part on a channel measurement.

20. The UE of claim 19, wherein the one or more processors, when determining whether to multiplex the BFRQ transmission with the other uplink transmission, are configured to:
determine to multiplex the BFRQ transmission with the other uplink transmission based at least in part on whether the channel measurement satisfying satisfies a channel measurement threshold.

21. The UE of claim 13, wherein the one or more processors are further configured to:
determine whether to multiplex the BFRQ transmission with the other uplink transmission based at least in part on a mapping of a scheduling request to a scheduled beam or scheduled cell.

22. The UE of claim 21, wherein the one or more processors, when determining whether to multiplex the BFRQ transmission with the other uplink transmission, are configured to:
determine not to multiplex the BFRQ transmission with the other uplink transmission based at least in part on the mapping being to a failed beam.

23. The UE of claim 13, wherein the one or more processors are further configured to:
determine whether to multiplex the BFRQ transmission with the other uplink transmission based at least in part on a timing of the uplink channel relative to one or more other available resources.

24. The UE of claim 23, wherein the one or more processors, when determining whether to multiplex the BFRQ transmission with the other uplink transmission, are configured to:
determine to multiplex the BFRQ transmission with the other uplink transmission based at least in part on the other uplink transmission being associated with an earliest available resource.

25. A non-transitory computer-readable medium storing a set of instructions for wireless communication, the set of instructions comprising:
one or more instructions that, when executed by one or more processors of a user equipment (UE), cause the UE to:
detect a collision between a beam failure recovery request (BFRQ) transmission to trigger a beam failure recovery for a secondary cell and another uplink transmission on an uplink channel of another secondary cell of a secondary cell group including the secondary cell;
determine whether to multiplex the BFRQ transmission with the other uplink transmission based at least in part on a characteristic of a n uplink beam associated with the uplink channel; and
transmit, on the uplink channel, at least one of the BFRQ transmission or the other uplink transmission based at least in part on multiplexing rule.

26. The non-transitory computer-readable medium of claim 25, wherein the other uplink transmission is an uplink control information or uplink data transmission.

27. An apparatus for wireless communication, comprising:
means for detecting a collision between a beam failure recovery request (BFRQ) transmission to trigger a beam failure recovery for a secondary cell and another uplink transmission on an uplink channel of another secondary cell of a secondary cell group including the secondary cell;

means for determining whether to multiplex the BFRQ transmission with the other uplink transmission based at least in part on a characteristic of an uplink beam associated with the uplink channel; and means for transmitting, on the uplink channel, at least one of the BFRQ transmission or the other uplink transmission based at least in part on multiplexing rule.

28. The apparatus of claim 27, wherein the other uplink transmission is an uplink control information or uplink data transmission.

\* \* \* \* \*